United States Patent
Hart et al.

(10) Patent No.: US 10,015,008 B2
(45) Date of Patent: Jul. 3, 2018

(54) FORMAT-PRESERVING ENCRYPTION OF BASE64 ENCODED DATA

(71) Applicant: International Business Machines Corporation, Armonk, NY (US)

(72) Inventors: Steven R. Hart, Holly Springs, NC (US); Eysha S. Powers, Wappingers Falls, NY (US); James W. Sweeny, Millbrook, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 177 days.

(21) Appl. No.: 14/968,006

(22) Filed: Dec. 14, 2015

(65) Prior Publication Data

US 2017/0170952 A1    Jun. 15, 2017

(51) Int. Cl.
*H04L 29/06* (2006.01)
*H04L 9/06* (2006.01)
*H04L 9/14* (2006.01)

(52) U.S. Cl.
CPC .............. *H04L 9/0618* (2013.01); *H04L 9/14* (2013.01); *H04L 2209/24* (2013.01); *H04L 2209/34* (2013.01)

(58) Field of Classification Search
CPC . H04L 9/06; H04L 9/14; H04L 9/0618; H04L 2209/16; H04L 2209/20; H04L 2209/24; H04L 2209/34
USPC ................................ 380/28, 29, 44; 713/189
See application file for complete search history.

(56) References Cited

U.S. PATENT DOCUMENTS

| | | | | |
|---|---|---|---|---|
| 6,223,287 | B1 * | 4/2001 | Douglas | H04L 63/0428 380/255 |
| 7,596,745 | B2 * | 9/2009 | Dignum | G06F 17/2247 711/104 |
| 7,716,577 | B2 * | 5/2010 | Behrens | G06F 15/7842 715/237 |
| 8,578,150 | B2 * | 11/2013 | Mahdavi | H04L 29/12066 713/155 |
| 8,990,266 | B2 | 3/2015 | Shea et al. | |
| 2008/0288774 | A1 * | 11/2008 | Mahdavi | H04L 29/12066 713/155 |
| 2009/0292963 | A1 | 11/2009 | Gass et al. | |
| 2010/0318468 | A1 | 12/2010 | Carr et al. | |
| 2014/0025538 | A1 * | 1/2014 | Kalgi | G06Q 30/0623 705/26.61 |
| 2014/0172597 | A1 | 6/2014 | Spies et al. | |

(Continued)

OTHER PUBLICATIONS

Diallo et al., "CloudProtect: Managing Data Privacy in Cloud Applications", 2012 IEEE Fifth International Conference on Cloud Computing (CLOUD '12). IEEE Computer Society, Washington, DC, USA, 303-310.

(Continued)

*Primary Examiner* — Hosuk Song
(74) *Attorney, Agent, or Firm* — Cantor Colburn LLP; William A. Kinnaman, Jr.

(57) ABSTRACT

A computer-implemented method for encrypting binary data may include encoding raw binary data in Base64 format to generate Base64 binary data. The Base64 binary data may be encrypted, by a computer processor, using format-preserving encryption to generate Base64 ciphertext. The Base64 ciphertext may be validatable by a Base64 validator.

18 Claims, 4 Drawing Sheets

(56) References Cited

U.S. PATENT DOCUMENTS

2016/0224795 A1 8/2016 Arnold et al.
2016/0224802 A1 8/2016 Arnold et al.

OTHER PUBLICATIONS

List of IBM Patents or Patent Applications treated as Related; Date Filed: Dec. 14, 2015, p. 1-2.

* cited by examiner

FORMAT-PRESERVING ENCRYPTION OF BASE64 ENCODED DATA

BACKGROUND

Embodiments of the present invention relate to format-preserving encryption and, more specifically, to format-preserving encryption of Base64 encoded data.

Encryption is a method to encode data such that only authorized parties can view it. With symmetric encryption, a single key value both encrypts and decrypts the data. The symmetric encryption algorithms used in Advanced Encryption Standard (AES) and Triple Data Encryption Standard (TDES), among others, use a key and with an optional initialization vector (IV) to scramble the data, producing ciphertext in which all bytes appear to be random numeric values from 0-255. The IV is a value incorporated into the encryption, where variation of this value ensures that the resulting ciphertext will vary even when inputting the same plaintext to be encrypted.

These algorithms work on blocks of data having eight or sixteen bytes per block. Thus, when a string is encrypted, the resulting ciphertext becomes binary, and its length grows to a multiple of the block size. While this makes for high security, it can be a problem for information technology systems that need to hold or channel data without actually processing it. Take for example a database in which one of the columns is a plaintext social security number (SSN). Updating the database to now have the SSN encrypted would require a schema change to change the SSN field from text to binary and to increase the size of the field from nine to sixteen bytes, resulting in increased storage usage.

Format-preserving encryption (FPE) exists to address the above issue. FPE encrypts data in place without changing the size or character set of the data being encrypted. In other words, the resulting ciphertext has the same size and character set as the original plaintext data.

There are several accepted FPE methods, including FFX [Radix], VAES3, BPS-BC, and Visa FPE (VFPE). The first three of these accomplish FPE by performing multiple rounds of encryption on the data. While this works, it requires considerable overhead. As a percentage of the entire operation, that overhead can be quite large for small data fields such as social security numbers, credit card numbers, and other sensitive personal data. The last of these methods, VFPE, was designed for performance. It differs from the others in that it is a stream cipher, as opposed to a block cipher, and therefore avoids the need for multiple rounds of encryption. However, VFPE can be problematic to implement because it is not secure if the key/IV combination is ever reused.

Base64 is a popular method for encoding binary data as text to embed that data in a text-based message protocol such as hypertext transfer protocol (HTTP). By itself, Base64 encoding is not a form of encryption, because the original binary data encoded in Base64 can be recovered by anyone who has access to the encoded data.

SUMMARY

According to an embodiment of this disclosure, a computer-implemented method for encrypting binary data may include encoding raw binary data in Base64 format to generate Base64 binary data. The Base64 binary data may be encrypted, by a computer processor, using format-preserving encryption to generate Base64 ciphertext. The Base64 ciphertext may be validatable by a Base64 validator.

In another embodiment, a system includes a memory having computer readable instructions and one or more processors for executing the computer readable instructions. The computer readable instructions may include encoding raw binary data in Base64 format to generate Base64 binary data. Further according to the computer readable instructions, the Base64 binary data may be encrypted using format-preserving encryption to generate Base64 ciphertext. The Base64 ciphertext may be validatable by a Base64 validator.

In yet another embodiment, a computer program product for encrypting binary data includes a computer readable storage medium having program instructions embodied therewith. The program instructions are executable by a processor to cause the processor to perform a method. The method may include encoding raw binary data in Base64 format to generate Base64 binary data. Further according to the computer readable instructions, the Base64 binary data may be encrypted using format-preserving encryption to generate Base64 ciphertext. The Base64 ciphertext may be validatable by a Base64 validator.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other features and advantages of the invention are apparent from the following detailed description taken in conjunction with the accompanying drawings in which:

DETAILED DESCRIPTION

Various embodiments of this disclosure are encryption systems and methods that utilize Visa format-preserving encryption (VFPE) applied to Base64 encoded data that is encapsulated in a message, where a unique encryption key is used for encrypting each such message.

Figure 1:
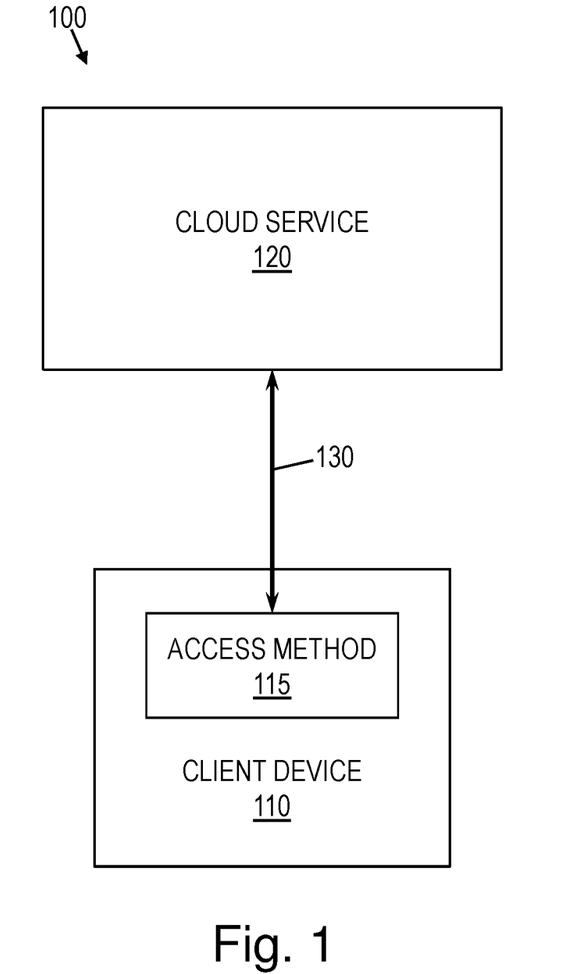
FIG. 1 is a block diagram of an encryption system, according to some embodiments of this disclosure.

FIG. 1 is a block diagram of an encryption system 100, according to some embodiments of this disclosure. The encryption system 100 may include a client device 110 and a cloud service 120, which may be incorporated into one or more servers. The client device 110 may transmit messages across a client-cloud interface 130 to the cloud service 120 for storage. The client-cloud interface 130 may take various forms, such as, for example, a network connection or a dedicated channel. In some embodiments, a message may include binary data that has been encoded in Base64 format and encapsulated in the message for transmission. For example, and not by way of limitation, the message may be formatted in extensible markup language (XML) or Java object notation (JSON). The client device 110 may call an access method 115 to access the cloud service 120 and transmit the messages to the cloud service 120, and may again call the access method 115 to retrieve the messages from the cloud service 120 as needed.

According to some embodiments, the cloud service 120 may store the binary data in encrypted form using VFPE or another format-preserving encryption (FPE) mechanism. This situation may occur, for instance, if an administrator of the cloud service 120 desires to store only encrypted data, or if a compliance requirement dictates that the binary data be encrypted before being stored to the cloud service 120.

Configuring the client-cloud interface 130 to encrypt data could be expensive in circumstances where the client-cloud interface 130 is initially formed without support for encryption, but then encryption is later desired. One option for handling this issue is to have an application on the client device 110 encrypt the raw binary data (i.e., the binary data before having been encoded in Base64 format) and then encode it in Base64. This would require an explicit action on the part of that application. A second option is to use a method at the cloud service 120 that implements standard encryption on the binary data when sending a message from the client device 110, and implements standard decryption on the binary data when receiving the message back at the client device 110. To preserve the Base64 format, that method would have to decode the Base64 binary data (i.e., the binary data encoded in Base64), encrypt the raw binary data that had been previously encoded in Base64 format, and then redo the Base64 encoding. While this would preserve the Base64 format, this might also increase the size of the Base64 binary data, which could potentially break the encapsulating message format.

Some embodiments of the encryption system 100 may address the difficulties with the above options. The encryption system 100 may use VFPE to encrypt the Base64 binary data in place, thus resulting in Base64 ciphertext having the same length and format as the Base64 binary data on which it is based. In some embodiments, the Base64 ciphertext would then be indistinguishable from standard Base64 plaintext that has not been encrypted. In other words, although the Base64 ciphertext may differ from the Base64 binary data of which it is an encrypted version, the Base64 ciphertext may appear to be encoded in Base64 and may thus pass any validators searching for data encoded in Base64 format.

More specifically, to send a message to the cloud service 120, the client device 110 may build the message with Base64 binary data, which may require encoded raw binary data. The message may be, for example, an XML or JSON message. The client device 110 may invoke the access method 115 to transmit the message to the cloud service 120. The access method 115 may perform in-place encryption of the Base64 binary data in the message, in a format preserving manner, such as by way of VFPE, and may send the message with resulting Base64 ciphertext to the cloud service 120. In some embodiments, the cloud service 120 may parse the message to ensure the binary data encapsulated is properly encoded in Base64, and the Base64 ciphertext may check out as properly encoded. The cloud service 120 may then store the message or the Base64 ciphertext contained therein.

To retrieve a message from the cloud service 120, the client device 110 may invoke the access method 115 to request the message. The message may be sent by the cloud service 120 and received by the access method 115. The access method 115 may perform an in-place decryption of the Base64 ciphertext in the message. The access method 115 may then provide the message with the decrypted Base64 binary data to the client device 110.

The encryption used as described above may be VFPE or another FPE mechanism. VFPE works well when a unique key is used for each set of data being encrypted. Thus, in some embodiments, the encryption system 100 may derive a unique key for each set of binary data sent across the client-cloud interface 130.

To this end, the encryption system 100 may use a static key for the binary data being sent in the messages, where the static key is the same for some or all binary data. For each set of binary data, where a set refers to the binary data within a single message, a unique key may be derived from the static key in combination with identifying information for the message. The identifying information may be unique for each message, and thus, the unique key derived from the combination of the static key and the identifying information may be unique as well.

The mechanism of combining the static key and the identifying information of a message into a unique key for the binary data within that message may vary based on implementation. For example, and not by way of limitation, in some embodiments, the identifying information may be encrypted with the static key, with the resulting ciphertext being used as the unique key for the binary data. In some other embodiments, the static key and the identifying information may be concatenated to produce the unique key, or the static key and the identifying information may be combined using exclusive OR (XOR) logic to produce the unique key. It will be understood that other mechanisms for combining these values are also within the scope of this disclosure.

In some embodiments, the identifying information used for each set of binary data may be extracted from metadata in the associated message, where that metadata relates to the binary data. For example, and not by way of limitation, a message may include a uniform resource locator (URL), which may describe a location of an object on the web represented by the binary data. In some embodiments, provided that the binary data is static, this URL is unique. However, if the binary data at the location described by the URL changes, then messages may include the same URL but different binary data, due to the change. In that case, it may be desirable to provide different identifying information, which would lead to a different unique key when binary data changes. Thus, in the case of binary data that has changed, the message encapsulating that binary data may include version information (e.g., a version number) in its metadata, and that version information may be combined with the URL to form the identifying information. The version information may change with each change to the binary data, thus leading to unique identifying information for each set of binary data.

Following is an example of an XML, message including Base64 binary data, which will be described further below:

```xml
<?xml version="1.0" encoding="UTF-8"?>
<sample>
    <description>
    An embedded image file.
    </description>
    <image name="stop.png" encoding="base64" source="IBM"
href="http://www.ibm.com/lab/icons/silk/">
iVBORw0KGgoAAAANSUhEUgAAABAAAAAQCAYAAAAf8/9hAAAABGdBTUE
AAK/INwWK6QAAABl0RVh0U29mdHdhcmUAQWRvYmUgSW1hZ2VSZWFkeXHJ
ZTwAAAJOSURBVDjLpZI9T1RBFIaf3buAoBgJ8rl6QVBJVNDCShMLOhBj6T+wN
UaDjY0WmpBIgYpAjL/AShJ+gVYYYRPIony5IETkQxZ2770zc2fGYpflQy2MJzk5J5
M5z/vO5ESstfxPxA4erL4Zuh4pLnoaiUZdq7XAGKzRJVbIBZ3JPLJaD9c/eCj/CFgZfNl
5qK5q8EhTXdxxLKgQjAFr0NK0ppOpt9n51D2gd2cmsvOElVcvOoprKvuPtriNzsY8rH
+H0ECoQEg4WklY1czP8akZby51p6G3b6QAWBl43llSVTlUfuZE3NmYh9Vl0HkHSu
Vq4ENFNWFdC+uJ5JI/9/V2Y//rkShA1HF6yk/VxJ0f07CcgkCB7+fSC8Dzcy7mp4l9/kh
lUzwecaI9hT+wRrsOISylcsphCFLl1RXIvBMpYDZJrKYRjHELACNEgC/KCQQofWB
Q5nuV64UAP8AEfrDrQEiLlJD18+p7BguwfAoBUmKEsLsAGZSiFWxtgWWP4gGAk
uB5YDRWylKAKIDJZBa1H8Kx47C1Cdls7qLnQTZffQ+20lB7EiU1ent7sQBQ6+vdq2
PJ5dC9ABW1sJnOQbL5Qc/HpNOYehf/4lW+jY4vh2tr3fsWafrWzRtlDW5f9aVzjUVj7
2FmCqzBypBQCKzbjLp8jZUPo7OZyYm7bYkvw/sAAFMd7V3lp5sGqs+fjRcZhVYK
Y0xupwysfpogk0jcb5ucffbbKu9Esv1Kl1N2+Ekk5rg2DIXRmog1Jdr3F/Tm5mO0edc6M
SP/CvjX+AV0DoH1Z+D54gAAAABJRU5ErkJggg==
    </image>
</sample>
```

Following is an example of a JSON message including Base64 binary data, which will be described further below:

```
{
"sample":{
    "description":"An embedded image file."
    "image":{
        "image-name":"stop.png"
        "image-encoding":"base64"
        "image-source":"IBM"
        "image-href":"http://www.ibm.com/lab/icons/silk/"
        "image-value":
"iVBORw0KGgoAAAANSUhEUgAAABAAAAAQCAYAAAAf8/9hAAAABGdBTU
EAAK/INwWK6QAAABl0RVh0U29mdHdhcmUAQWRvYmUgSW1hZ2VSZWFkeX
HJZTwAAAJOSURBVDjLpZI9T1RBFIaf3buAoBgJ8rl6QVBJVNDCShMLOhBj6T+w
NUaDjY0WmpBIgYpAjL/AShJ+gVYYYRPIony5IETkQxZ2770zc2fGYpflQy2MJzk5J
5M5z/vO5ESstfxPxA4erL4Zuh4pLnoaiUZdq7XAGKzRJVbIBZ3JPLJaD9c/eCj/CFgZf
Nl5qK5q8EhTXdxxLKgQjAFr0NK0ppOpt9n51D2gd2cmsvOElVcvOoprKvuPtriNzsY8r
H+H0ECoQEg4WklY1czP8akZby51p6G3b6QAWBl43llSVTlUfuZE3NmYh9Vl0HkHS
uVq4ENFNWFdC+uJ5JI/9/V2Y//rkShA1HF6yk/VxJ0f07CcgkCB7+fSC8Dzcy7mp4l9/k
hlUzwecaI9hT+wRrsOISylcsphCFLl1RXIvBMpYDZJrKYRjHELACNEgC/KCQQofW
BQ5nuV64UAP8AEfrDrQEiLlJD18+p7BguwfAoBUmKEsLsAGZSiFWxtgWWP4gGA
kuB5YDRWylKAKIDJZBa1H8Kx47C1Cdls7qLnQTZffQ+20lB7EiU1ent7sQBQ6+vdq
2PJ5dC9ABW1sJnOQbL5Qc/HpNOYehf/4lW+jY4vh2tr3fsWafrWzRtlDW5f9aVzjUVj
72FmCqzBypBQCKzbjLp8jZUPo7OZyYm7bYkvw/sAAFMd7V3lp5sGqs+fjRcZhVYK
Y0xupwysfpogk0jcb5ucffbbKu9Esv1Kl1N2+Ekk5rg2DIXRmog1Jdr3F/Tm5mO0edc6M
SP/CvjX+AV0DoH1Z+D54gAAAABJRU5ErkJggg=="
    }
}
```

In both the above examples, the identifying information may be a concatenation of the strings "http://www.ibm.com/lab/icons/silk/" and "stop.png," which appear in both the example XML and JSON messages above. The result of concatenating these strings is in an URL for the binary data in these messages.

As discussed above, in some embodiments, encrypting the Base64 binary data of a message includes applying VFPE to the Base64 binary data, using the unique key derived from the static key and the identifying information that is associated with both the message and with the Base64 binary data.

With conventional Base64 encoding methods, the encoding operates on raw binary data in 3-byte segments. Each such segment of the raw binary data may be converted to a 4-byte segment of Base64 binary data in the form of text from the Base64 character set. Specifically, for instance, each byte of the resulting 4-byte segment may be a single character from the Base64 character set, such that each 4-byte segment includes four characters. This Base64 character set is made up of the following characters: "ABCDEFGHIJKLMNOPQRSTUVWXYZabcdefghijklmnopqrstuvwxyz0123456789+/".

As a result, conventionally, the size of a set of Base64 binary data is a multiple of four bytes. If a set of raw binary data happens to be an even multiple of three bytes, then all characters in the resulting Base64 binary data come from the above Base64 character set. In that case, the final segment of Base64 binary data may have four bytes of characters from the Base64 character set, as with the other segments of the Base64 binary data. In contrast, if the raw binary data does not have an even multiple of three bytes, such that the final segment of the raw binary data is not a full three bytes, then the corresponding final 4-byte segment of Base64 binary data may end with one or two instances of a padding character, which is conventionally an equals sign ('=').

Throughout the remainder of this disclosure, FS denotes the final segment of Base64 binary data, encoded from raw binary data. This segment may be four bytes long, each byte being a single character. More specifically, each FS[i] denotes the $i^{th}$ character in the segment. If the final segment of the raw binary data is two bytes rather than three bytes, conventionally, FS[1] and FS[2] are selected from the Base64 character set in accordance with standard Base64 encoding methods, and FS[3] is selected from the following 16-character set: "AEIMQUYcgkosw048". In that case, FS[4] is set to the padding character. In contrast, if the final segment of the raw binary data is 1 byte rather than three bytes, FS[1] is conventionally selected from the Base64 character set in accordance with standard Base64 encoding methods, and FS[2] is selected from the following 4-character set: "AQgw". FS[3] and FS[4] are both set to the padding character.

According to some embodiments, VFPE may be applied to the resulting Base64 binary data, and a VFPE algorithm may use the advanced encryption standard (AES) or triple data encryption standard (TDES) block ciphers. The VFPE algorithm may take as input a parameter n, the size of the character set to be encrypted, and the parameter k, the number of characters that can be encrypted using one cipher block.

In some embodiments, when encrypting Base64 binary data with VFPE, n=64 works when handling characters from the Base64 character set. However, characters in the final segment of the Base64 binary data may be a special case, given that each such final segment may include one or two instances of the padding characters as well as characters selected from the smaller 16-character or 4-character sets. For encrypting the final segment of the Base64 binary data, some embodiments of the encryption system 100 may use at least one of a length-preservation method and a length-obfuscation method.

In the length-preservation method, if the final segment of the Base64 binary data does not end in the padding character, then in some embodiments, neither will the final segment of the Base64 ciphertext. In that case, the standard Base64 character set may be used to encrypt all characters of the Base64 binary data. However, if the final segment of Base64 binary data ends with a single padding character, then in some embodiments, the Base64 ciphertext may also end with the padding character. In that case, the standard Base64 character set may be used for all but the last two characters of the Base64 ciphertext. For the second to last character, the value of n for the VFPE algorithm may be changed to n=16 with the 16-character set of "AEIMQUYcgkosw048", and the last character may be set to the padding character. If the final segment of the Base64 binary data ends with two padding characters, then in some embodiments, the last two characters of the Base64 ciphertext may also be padding characters. In that case, the standard Base64 character set may be used for all but the last three characters of the Base64 ciphertext. For the third to last character, the value of n for the VFPE algorithm may be changed to n=4 with the 4-character set of "AQgw", and the second to last and last characters may be set to the padding character. Thus, the Base64 ciphertext may end in the same number of padding characters as did the Base64 binary data.

Conventionally, VFPE works by computing one or more AES or TDES cipher blocks, and by using each cipher block to encrypt a predetermined number, k, of characters. Together, these cipher blocks make up the VFPE counter mode stream. In some embodiments, because the numerals 4 and 16, which may be used for n in the final segment as discussed above, both evenly divide 64, the established VFPE counter mode stream for encrypting prior segments may be used for the encryption of the final segment as well. A further AES or TDES cipher block, in addition to those already used, may be generated and used if the stream was exhausted, i.e., if k characters have already been encrypted from the current cipher block.

With this length-preservation method, the padding characters in the Base64 binary data may be preserved in the Base64 ciphertext. As a result, this method may enable semantics checking and parsing routines to determine the true length of the Base64 binary data and the raw binary data without needing to decrypt the Base64 ciphertext. This may be useful for cases in which the parsing routines are aware of how big the Base64 binary data or the raw data should be and would report an error if a different size were found.

In the length-obfuscation method, the full Base64 character set may be used for all but the last three characters of the Base64 ciphertext. The last three characters, corresponding to FS[2], FS[3], and FS[4], may be treated as a single large element where n=263,172 and k=1 for the VFPE algorithm. A further AES or TDES cipher block, in addition to those already used, may be generated and used to encrypt this large character.

This length-obfuscation method may thus require an enlarged element set for n=263,172, and this enlarged element set may be based on the previously mentioned Base64 character set, 16-character set, 4-character set, and padding character. The enlarged element set may be as follows, in ordinal order: AAA, AAB, AAC, AAD, . . . //8 //9 //+/// (i.e., $64^3$ elements with each element including three characters from the Base64 character set); AA=AE=AI=AM= . . . /w=/0=/4=/8= (i.e., 64*16 elements with each element including a first character from the Base64 character set, a second character from the 16-character set, and the padding character); and A==Q==g==w== (i.e., 4 elements with each element including a character from the 4-character set and two padding characters).

With the length-obfuscation method, the padding characters in the Base64 binary data need not be preserved in the Base64 ciphertext. Thus, this method may hide the true length of the Base64 binary data and the corresponding raw binary data, which may be considered a more secure alternative compared to the length-preservation method. This length-obfuscation method may be preferred for cases in which parsing routines either are not used or do not check for the length of the binary data being stored at the cloud service 120.

Figure 2:
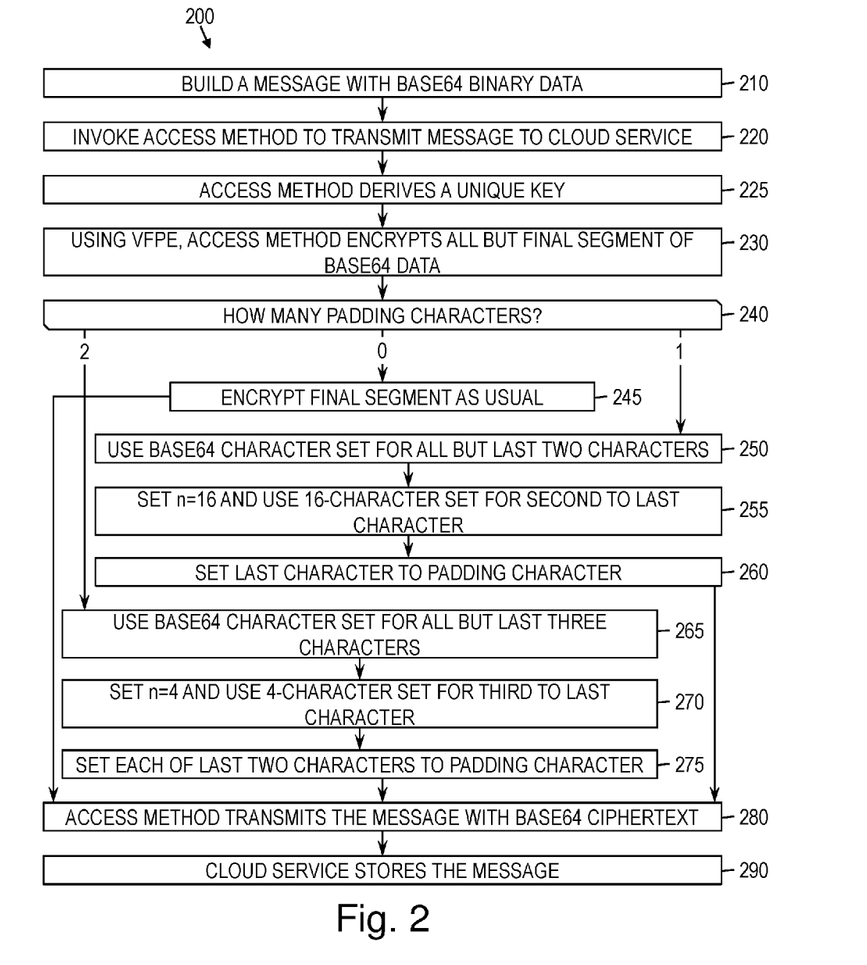
FIG. 2 is a flow diagram of a method for transmitting a message with encrypted binary data, using a length-preservation mechanism, according to some embodiments of this disclosure.

FIG. 2 is a flow diagram of a method 200 for transmitting a message with encrypted binary data, using a length-preservation mechanism, according to some embodiments of this disclosure. At block 210, to send a message to a cloud service 120, a client device 110 may build the message with Base64 binary data. The message may be, for example, an XML or JSON message. At block 220, the client device 110 may invoke an access method 115 to transmit the message to the cloud service 120.

The access method 115 may perform in-place encryption of the Base64 binary data in the message, which may be performed by way of VFPE. To this end, at block 225, the access method may derive a unique key for the Base64 binary data based on a static key and identifying information in the message. At block 230, the access method 115 may encrypt all but a final 4-byte segment of the Base64 binary data. At decision block 240, it may be determined how many padding characters the final segment ends with. If the final segment ends with no padding characters, then at block 245 the final segment may be encrypted as usual according to VFPE.

If the final segment of the Base64 binary data ends with a single padding character, then at block 250, the standard Base64 character set may be used for all but the last two characters of the Base64 ciphertext for the final segment. Further, at block 255, for the second to last character, the value of n for the VFPE algorithm may be changed to n=16 with the 16-character set of "AEIMQUYcgkosw048". At block 260, the last character may be set to the padding character.

If the final segment of the Base64 binary data ends with two padding characters, then at block 265 the standard Base64 character set may be used for all but the last three characters of the Base64 ciphertext. Further, at block 270, for the third to last character, the value of n for the VFPE algorithm may be changed to n=4 with the 4-character set of "AQgw". At block 275, the second to last and last characters may be set to the padding character.

At block 280, after the Base64 ciphertext has been constructed according to blocks 225 through 275, the access method 115 may transmit the message, with the Base64 ciphertext, to the cloud service 120 as requested by the client device 110. At block 290, the cloud service 120 may store the message.

Figure 3:
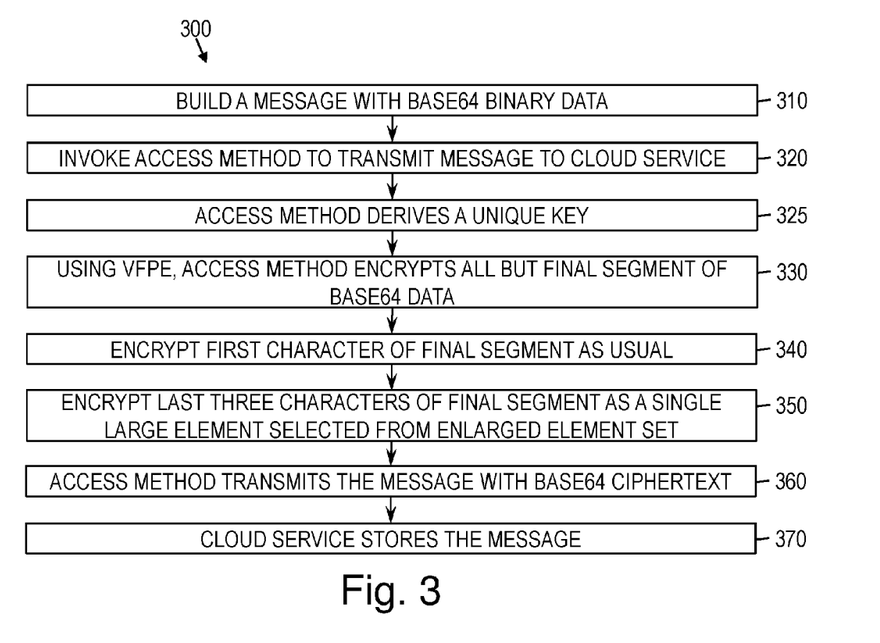
FIG. 3 is a flow diagram of a method for transmitting a message with encrypted binary data, using a length-obfuscation mechanism, according to some embodiments of this disclosure.

FIG. 3 is another flow diagram of a method 300 for performing VFPE on Base64 encoded data, using a length-obfuscation mechanism, according to some embodiments of this disclosure. At block 310, to send a message to a cloud service 120, a client device 110 may build the message with Base64 binary data. The message may be, for example, an XML or JSON message. At block 320, the client device 110 may invoke an access method 115 to transmit the message to the cloud service 120.

The access method 115 may perform in-place encryption of the Base64 binary data in the message, which may be performed by way of VFPE. To this end, at block 325, the access method may derive a unique key for the Base64 binary data based on a static key and identifying information in the message. At block 330, the access method 115 may encrypt all but a final 4-byte segment of the Base64 binary data. At block 340, the first character of the final segment may be encrypted as usual according to VFPE. At block 350, the last three characters of the final segment may be encrypted as a single large element where n=263,172 and k=1 for the VFPE algorithm, using an enlarged element set such as the one described above.

At block 360, after the Base64 ciphertext has been constructed according to blocks 325 through 350, the access method 115 may transmit the message, with Base64 ciphertext, to the cloud service 120 as requested by the client device 110. At block 370, the cloud service 120 may store the message.

Figure 4:
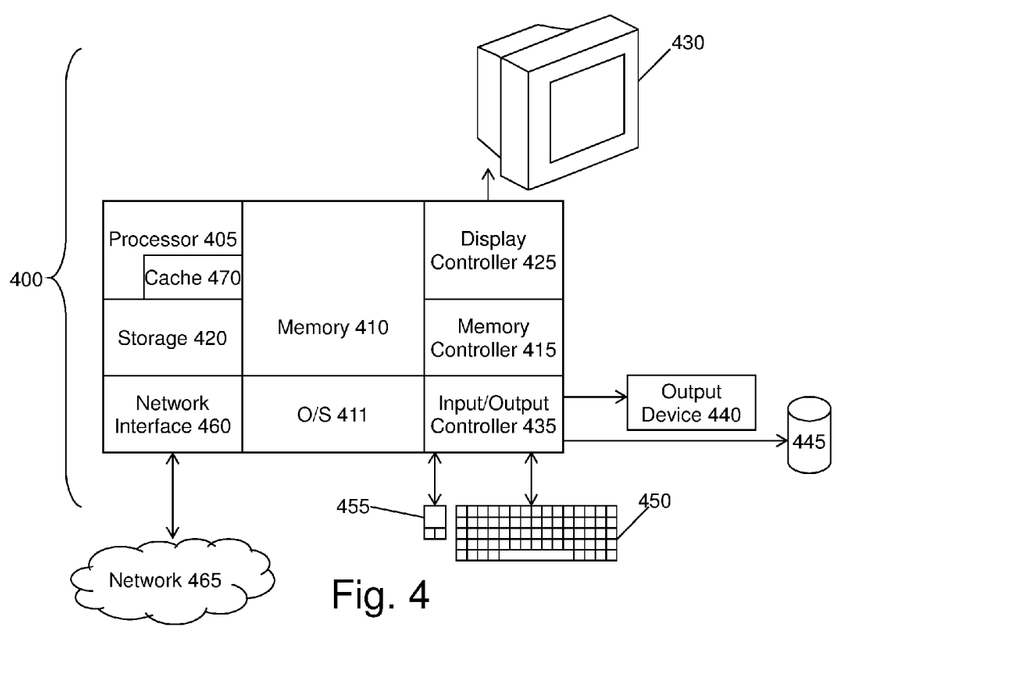
FIG. 4 is a block diagram of a computer system for implementing some or all aspects of the encryption system, according to some embodiments of this disclosure.

FIG. 4 illustrates a block diagram of a computer system 400 for use in implementing an encryption system 100 or method according to some embodiments. The encryption systems 100 and methods described herein may be implemented in hardware, software (e.g., firmware), or a combination thereof. In some embodiments, the methods described may be implemented, at least in part, in hardware and may be part of the microprocessor of a special or general-purpose computer system 400, such as a personal computer, workstation, minicomputer, or mainframe computer. For instance, the client device 110 may be a computer system 400, and the cloud service 120 may operate across one or more servers, which may be computer systems 400.

In some embodiments, as shown in FIG. 4, the computer system 400 includes a processor 405, memory 410 coupled to a memory controller 415, and one or more input devices 445 and/or output devices 440, such as peripherals, that are communicatively coupled via a local I/O controller 435. These devices 440 and 445 may include, for example, a printer, a scanner, a microphone, and the like. Input devices such as a conventional keyboard 450 and mouse 455 may be coupled to the I/O controller 435. The I/O controller 435 may be, for example, one or more buses or other wired or wireless connections, as are known in the art. The I/O controller 435 may have additional elements, which are omitted for simplicity, such as controllers, buffers (caches), drivers, repeaters, and receivers, to enable communications.

The I/O devices 440, 445 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 405 is a hardware device for executing hardware instructions or software, particularly those stored in memory 410. The processor 405 may be a custom made or commercially available processor, a central processing unit (CPU), an auxiliary processor among several processors associated with the computer system 400, a semiconductor based microprocessor (in the form of a microchip or chip set), a macroprocessor, or other device for executing instructions. The processor 405 includes a cache 470, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 470 may be organized as a hierarchy of more cache levels (L1, L2, etc.).

The memory 410 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 410 may incorporate electronic, magnetic, optical, or other types of storage media. Note that the memory 410 may have a distributed architecture, where various components are situated remote from one another but may be accessed by the processor 405.

The instructions in memory 410 may include one or more separate programs, each of which comprises an ordered listing of executable instructions for implementing logical functions. In the example of FIG. 4, the instructions in the memory 410 include a suitable operating system (OS) 411. The operating system 411 essentially may control the execution of other computer programs and provides scheduling, input-output control, file and data management, memory management, and communication control and related services.

Additional data, including, for example, instructions for the processor 405 or other retrievable information, may be stored in storage 420, which may be a storage device such as a hard disk drive or solid state drive. The stored instructions in memory 410 or in storage 420 may include those enabling the processor to execute one or more aspects of the encryption systems 100 and methods of this disclosure.

The computer system 400 may further include a display controller 425 coupled to a display 430. In some embodiments, the computer system 400 may further include a network interface 460 for coupling to a network 465. The network 465 may be an IP-based network for communication between the computer system 400 and an external server, client and the like via a broadband connection. The network 465 transmits and receives data between the computer system 400 and external systems. In some embodiments, the network 465 may be a managed IP network administered by a service provider. The network 465 may be implemented in a wireless fashion, e.g., using wireless protocols and technologies, such as WiFi, WiMax, etc. The network 465 may also be a packet-switched network such as a local area network, wide area network, metropolitan area network, the Internet, or other similar type of network environment. The network 465 may be a fixed wireless network, a wireless local area network (LAN), a wireless wide area network (WAN) a personal area network (PAN), a virtual private network (VPN), intranet or other suitable network system and may include equipment for receiving and transmitting signals.

Encryption systems and methods according to this disclosure may be embodied, in whole or in part, in computer program products or in computer systems 400, such as that illustrated in FIG. 4.

Technical effects and benefits of some embodiments include the ability to perform format-preserving encryption on binary data encoded in Base64 without breaking the format of a message encapsulating that binary data. Further, according to some embodiments, this may be achieved in a secure manner through the use of a unique key for each message, without requiring additional storage for each unique key.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for encrypting binary data, comprising:

encoding raw binary data in Base64 format to generate Base64 binary data;

encapsulating the Base64 binary data in a message; and encrypting, by a computer processor, the Base64 binary data using format-preserving encryption to generate Base64 ciphertext, wherein the Base64 ciphertext is validatable by a Base64 validator;

wherein the encrypting utilizes a unique key for the Base64 binary data; and wherein the unique key is derived from identifying information in the message as well as a static key used in encrypting one or more other messages.

2. The computer-implemented method of claim 1, wherein the identifying information is a uniform resource locator of an object represented by the Base64 binary data.

3. The computer-implemented method of claim 1, wherein the encrypting comprises preserving in the Base64 ciphertext a length of the Base64 binary data.

4. The computer-implemented method of claim 3, wherein the preserving in the Base64 ciphertext the length of the Base64 binary data comprises including in a final segment of the Base64 ciphertext a number of padding characters matching a number of padding characters in a final segment of the Base64 binary data.

5. The computer-implemented method of claim 1, wherein the encrypting comprises obfuscating in the Base64 ciphertext a length of the Base64 binary data.

6. The computer-implemented method of claim 5, wherein the obfuscating in the Base64 ciphertext the length of the Base64 binary data comprises:

establishing an enlarged element set comprising 263,172 elements of three characters each; and selecting an element from the enlarged element set to use in a final segment of the Base64 ciphertext.

7. A system for encrypting binary data, comprising:

a memory having computer readable instructions; and one or more processors for executing the computer readable instructions, the computer readable instructions comprising:

encoding raw binary data in Base64 format to generate Base64 binary data;

encapsulating the Base64 binary data in a message; and encrypting the Base64 binary data using format-preserving encryption to generate Base64 ciphertext, wherein the Base64 ciphertext is validatable by a Base64 validator;

wherein the encrypting utilizes a unique key for the Base64 binary data; and wherein the unique key is derived from identifying information in the message as well as a static key used in encrypting one or more other messages.

8. The system of claim 7, wherein the identifying information is a uniform resource locator of an object represented by the Base64 binary data.

9. The system of claim 7, wherein the encrypting comprises preserving in the Base64 ciphertext a length of the Base64 binary data.

10. The system of claim 9, wherein the preserving in the Base64 ciphertext the length of the Base64 binary data comprises including in a final segment of the Base64 ciphertext a number of padding characters matching a number of padding characters in a final segment of the Base64 binary data.

11. The system of claim 7, wherein the encrypting comprises obfuscating in the Base64 ciphertext a length of the Base64 binary data.

12. The system of claim 11, wherein the obfuscating in the Base64 ciphertext the length of the Base64 binary data comprises:
    establishing an enlarged element set comprising 263,172 elements of three characters each; and
    selecting an element from the enlarged element set to use in a final segment of the Base64 ciphertext.

13. A computer program product for encrypting binary data, the computer product comprising a non-transitory computer readable storage medium having program instructions embodied therewith, the program instructions executable by a processor to cause the processor to perform a method comprising:
    encoding raw binary data in Base64 format to generate Base64 binary data;
    encapsulating the Base64 binary data in a message; and
    encrypting the Base64 binary data using format-preserving encryption to generate Base64 ciphertext, wherein the Base64 ciphertext is validatable by a Base64 validator,
    wherein the encrypting utilizes a unique key for the Base64 binary data; and
    wherein the unique key is derived from identifying information in the message as well as a static key used in encrypting one or more other messages.

14. The computer program product of claim 13, wherein the identifying information is a uniform resource locator of an object represented by the Base64 binary data.

15. The computer program product of claim 13, wherein the encrypting comprises preserving in the Base64 ciphertext a length of the Base64 binary data.

16. The computer program product of claim 15, wherein the preserving in the Base64 ciphertext the length of the Base64 binary data comprises including in a final segment of the Base64 ciphertext a number of padding characters matching a number of padding characters in a final segment of the Base64 binary data.

17. The computer program product of claim 13, wherein the encrypting comprises obfuscating in the Base64 ciphertext a length of the Base64 binary data.

18. The computer program product of claim 17, wherein the obfuscating in the Base64 ciphertext the length of the Base64 binary data comprises:
    establishing an enlarged element set comprising 263,172 elements of three characters each; and
    selecting an element from the enlarged element set to use in a final segment of the Base64 ciphertext.

* * * * *